(12) United States Patent
Murcin

(10) Patent No.: US 11,623,149 B2
(45) Date of Patent: Apr. 11, 2023

(54) SYSTEM, METHOD, AND PLATFORM FOR CREATING NON-FUNGIBLE TOKENS FOR CONCEALING AND REVEALING THE OWNERSHIP INFORMATION OF AND EMBEDDING PREDICTIONS INTO DIGITAL AVATARS

(71) Applicant: David C. Murcin, Los Angeles, CA (US)

(72) Inventor: David C. Murcin, Los Angeles, CA (US)

( * ) Notice: Subject to any disclaimer, the term of this patent is extended or adjusted under 35 U.S.C. 154(b) by 0 days.

(21) Appl. No.: 17/735,429

(22) Filed: May 3, 2022

(65) Prior Publication Data

US 2022/0258059 A1 Aug. 18, 2022

Related U.S. Application Data

(63) Continuation-in-part of application No. 16/830,161, filed on Mar. 25, 2020, now Pat. No. 11,354,976, which is a continuation-in-part of application No. 15/179,845, filed on Jun. 10, 2016, now Pat. No. 10,610,790.

(51) Int. Cl.
 *A63F 13/00* (2014.01)
 *A63F 13/79* (2014.01)

(52) U.S. Cl.
 CPC .................................. *A63F 13/79* (2014.09)

(58) Field of Classification Search
 None
 See application file for complete search history.

(56) References Cited

U.S. PATENT DOCUMENTS

| | | | |
|---|---|---|---|
| 10,715,329 B1 * | 7/2020 | Wellman | H04L 63/0861 |
| 2019/0299105 A1 * | 10/2019 | Knight | H04L 9/3247 |
| 2020/0005284 A1 * | 1/2020 | Vijayan | H04L 63/08 |
| 2021/0118085 A1 * | 4/2021 | Bushnell | H04L 9/50 |
| 2021/0201336 A1 * | 7/2021 | Mallett | G06F 3/011 |
| 2021/0248594 A1 * | 8/2021 | Yantis | G06Q 20/4016 |
| 2022/0036404 A1 * | 2/2022 | Choi | G06Q 20/3829 |
| 2022/0069996 A1 * | 3/2022 | Xue | H04L 9/3239 |
| 2022/0075845 A1 * | 3/2022 | Bowen | G06F 21/10 |

* cited by examiner

*Primary Examiner* — Sunit Pandya

(57) ABSTRACT

A method of performing data analytics for daily fantasy sports games comprises collecting sets of predictions from a multitude of online players prior to the start of a game period. Each set includes numerical predictions of performances of different athletes at different positions in different performance categories in at least one sporting event. The predictions are locked at a predetermined time prior to the start of the game period. The method further comprises visually displaying statistics of the predictions to all of the online players after the predictions have been locked, but prior to the start of the game period.

20 Claims, 16 Drawing Sheets

SYSTEM, METHOD, AND PLATFORM FOR CREATING NON-FUNGIBLE TOKENS FOR CONCEALING AND REVEALING THE OWNERSHIP INFORMATION OF AND EMBEDDING PREDICTIONS INTO DIGITAL AVATARS

PRIORITY CLAIM

This application is a continuation-in-part of, and claims the benefits of and priorities to the following applications: U.S. non-provisional, application Ser. No. 16/830,161, filed Mar. 25, 2020, which in claims the benefit of and priority U.S. non-provisional, application Ser. No. 15/179,845, filed Jun. 10, 2016.

BACKGROUND

In traditional fantasy sports games, players compete against others by building a team of professional athletes from a particular league or competition while remaining under a salary cap, and earn points based on the actual statistical performance of the players in real-world competitions. In daily fantasy sports, players compete over short-term periods, such as a week or single day of competition, as opposed to those that are played across an entire season. Daily fantasy sports are typically structured in the form of paid competitions typically referred to as a "contest." Winners receive a share of a predetermined pot funded by their entry fees. However, established fantasy sports platforms and systems do not provide features dedicated to gamifying the environment within which predictions pertaining to the real-world competitions occur. Existing platforms and systems provide methods for making predictions about the players of the real-world competitions but do not provide methods for making predictions about players of the fantasy sports games themselves.

SUMMARY

This application describes a system and platform for the creation of non-fungible tokens (NFTs) using user avatars in conjunction with predictions directed toward various outcomes for and within game events (Outcome Predictions). Additionally, the NFTs are created so as to enable predictions relating to the identity of the NFT creator (Identity Predictions). These NFTs incorporate the graphical aspects of user avatars, the informational qualities of the predictions (which are also represented graphically), and any transactions involving the NFT. The results of this incorporation may be referred to as NFT Avatars.

The system and platform enables predictions regarding the creator identities of the NFT Avatars. Identity Predictions may be received by the platform from online users of the platform. In order to increase the challenge of correctly identifying avatar identities, the avatars may be disguised by the platform as well as the creator. Identification information and identities herein refer, generally, to ownership information and the identities of the owners of the NFT Avatars, but these terms could also be used in a narrower sense in only referencing the initial owner (i.e., the creator) of the avatars, and therefore not used to refer to subsequent owners of the NFT Avatars.

The NFT Avatars are similar to other NFTs in that they are formed at least in part using blockchain technology, particularly cryptocurrency blockchain technology such as but not limited to Ethereum. Additionally, the NFT Avatars utilize a modified version of avatars to comprise their digital media component. The ownership (as well as the history thereof) of the modified avatars is recorded in the blockchain. The modification of the avatar involves the submission of an avatar by a user (referred to herein as the creator, even though it may be in fact merely a user who purchased the avatar for use as the user's own avatar), a set of changes applied by the creator to conceal the identity of the creator, a submission of an Outcome Prediction by the creator, and a set of changes applied by the system to embed (and conceal) the Outcome Prediction into the avatar. Other modifications of the avatar may be latent, in that a set of changes to reveal the identity of the creator, reveal the Outcome Prediction, or reveal the success or failure of the Outcome prediction will only occur at later designated times or upon designated events occurring. Once the modified and embedded avatar is complete, its digital information is encoded into the blockchain to create an NFT Avatar. When features are embedded in an avatar, it means that the features are graphically displayed on the avatar, including on various accoutrements of the avatar. The features may also be incorporated into NFT in the sense that their data qualities are recorded in the blockchain.

The avatar can be imported into the platform or created on the platform via a set of tools made available to the creator. The platform may also enable the importation of an avatar and its subsequent modification. The platform may automatically modify the avatar in order to obtain consistency amongst the avatars on the platform. Such consistencies may pertain to size (with respect to various graphical items that may be displayed in juxtoposition with the avatar), the inclusion of necessary graphical elements (such as a base or platform upon which the avatar graphically appears to sit or stand or over which it hovers).

Media that may pertain to the NFT Avatar include: photographs, pictures, music, memes, video, art, GIFs, tweets, audio recordings, podcasts, or other digital graphical or audio data.

In one embodiment, the platform engages with the social media accounts of the creators wishing to submit avatars for creating NFT Avatars. Engagement may occur via accessing the APIs, and may be directed toward, first, verifying the identity (i.e., name or public alias) of the user, and second detecting the number of followers, likes, or other signs that the user is adequately known as an influencer or celebrity. The platform may make the creation of NET Avatars contingent on a threshold of followers or likes being detected. Alternatively, the platform may simply categorize creators who are able to meet the threshold as celebrities for the purpose of later displaying, revealing, or otherwise treating the celebrity NFT Avatars differently from NFT Avatars made by creators unable to meet the threshold. Other thresholds usable by the system include awards received, medals received, boxoffice success, and the like. In one variation, creators may submit requests to administrators of the platform to be included in the celebrity category and to obtain the resulting special treatment.

In one embodiment, the avatar is at least initially graphically disguised. In one variation, only avatars made by users categorized as celebrities may be provided disguise tools. Graphical portions of the disguise may apply to conventional humanoid body parts such as the head, particularly the face, the torso, hands, etc. Clear identifiers such as tattoos may also be disguised. While many avatars are humanoid, variations encompass animal body parts, such as wings and tails, or quadrupedism. Such features may also be disguised. Avatars may include recordings of the voices of the owners.

Sometimes these voices are distorted in order to better match or amplify qualities in the avatar. Since these voices, whether natural or distorted, may undesirably signal the identity of the owner, disguising techniques may extend to audio qualities as well. Occasionally, avatars appear in conjunction with familiars, such as graphical pets. Disguise techniques, both graphical and audio, may extend to familiars as well. The creator may choose to omit certain disguise techniques in order to provide hints to an audience as to the creator's identity while maintaining a desirable level of ambiguity or mystery.

Disguise techniques include the use of graphical elements, called Disguise Elements, which may be applied to the avatar. Disguise Elements may be used to obfuscate the creator's identity, but they can also be used to provide flavoring. In these instances, the Disguise Elements may function as Flavor Elements. One clear example of Flavor Elements include backgrounds which are 2D or 3D images or animations displayed substantially behind the avatar. Since Flavor Elements may function as Disguise Elements and vice versa, the terms are used interchangeably here.

The creator of the avatar may choose Disguise Elements to be embedded into the avatar via a graphical interface provided by the platform. Disguise Elements may be still or animated. The user interface may include drag-and-drop features, or any other technique for permitting the creator to see a selection of Disguise Elements to choose from and a method to communicate the choice to the platform. The choice may include not only a Disguise Element but also the location on the avatar onto which the Disguise Element attaches. Disguises may constitute a set of Disguise Elements of which a subset may be deselected by the user. Disguise Elements may also be modified by the creator—such modifications may include color, pattern (including graphical designs such as logos), transparency, configuration (such as a zippered or unzippered jacket), or orientation (such as a hat worn forwards, sideways, or backwards). Disguises may constitute attire or objects held by or placed in the vicinity of the avatar, such as canes, phones, musical instruments, weapons, etc. Disguise Elements may constitute ambient elements, including weather condition (rain, snow, sunshine), lighting conditions (concentrated sunbeam, stark shadows, darkness, or glowing), magical conditions (sparkling, infernal effects, blurring, etc.), or other similar condition types. Disguise Elements may also constitute an animal or other being which can be merely adjacent to the avatar or interact with the avatar via gestures, speech, or other movements and vocalizations.

In order to assist the user in disguising an avatar, the disguise or Disguise Elements may comprise locking coordinates, which are fixed to the disguise or Disguise Elements are various graphical positions and which are matched to corresponding locking coordinates on the avatar. There may be more than one set of corresponding locking coordinates on an avatar to enable the user to control how the disguise or Disguise Elements fit the avatar. For example, the user can control the orientation of a hat on an avatar's head by selecting which locking coordinate(s) on the head to match to which locking coordinate(s) on the hat. The locking coordinates on a disguise or Disguise Element may also be matched to other locking coordinates on the same disguise or Disguise Element. For example, with respect to a jacket as a Disguise Element, by selecting which, and whether, any given set of locking coordinates match other locking coordinates on the Disguise Element, the user may control the degree to which the jacket is zippered or buttoned.

When locking coordinates are in sufficient graphical proximity, the objects featuring the locking coordinates move closer together until they appear to snap into place. Additional time or virtual force may be required by the creator to unlock the locking coordinates and separate the objects.

Avatars that may be created on the platform or submitted thereon may include VR (virtual reality) Avatars, AR (augmented reality) avatars, 2D avatars, 3D avatars, or any other graphical features that serve as an online representation of the creator.

In one embodiment, the orientation or movement of the avatar may be captured via detecting the positioning, orientation, or movement of the creator of the avatar via various VR implements. VR implements may include any sensor or device used to track the movement, positioning, and/or orientation of the user's physical body. Thus, if the creator performs a squat and jump, the VR implements may transmit spatial data to the platform, which would in turn impose them onto the avatar. If the creator spreads his fingers to cover his face, that too would be captured by the platform and imposed onto the avatar.

The Outcome Prediction may by received by the platform from the user via one or more entry fields, with the entry fields configured to receive numerical or text inputs, including selections made from drop-down menus. The entry fields may include numerical comparison symbols, such as less than, greater than, or equal to. The Outcome Prediction may pertain to performance categories for one or more athletes or even the outcome of a game.

An assortment of Outcome Predictions may also be offered by the platform for users to select—by selecting an Outcome Prediction, the user effectively adopts that Outcome Prediction. In one variation, users may suggest Outcome Predictions which other users may choose to adopt. In one variation, Outcome Predictions incorporate wagers. In this variation, a user predicts not only that a given game event will occur, but is willing to pay if the prediction does not occur. At the same time, the user expects an award, and the platform or other users will award the user, if the prediction is correct. The wagers may be materialized in a cryptocurrency, particularly the cryptocurrency native to the system, as will be described. In one variation, a user makes a wager by buying an NFT using cryptocurrency, with the NFT then incorporating the user's avatar as part of the digital media. Since the NFT can later be sold, the platform may enable users to make profits by making wagers. Wagers may include either prop bets or wagers regarding the final outcome of a game.

In one embodiment, the Outcome Prediction is embedded into the NFT Avatar. The platform may automatically display the Outcome Prediction on a display surface configured to be held by the avatar. The display surface may be in the form of a piece of paper or placard, an electronic device such as a laptop or smart phone, or any other object routinely used to communicate information. Thus, the Outcome Prediction may be embedded in Flavor Elements. The Outcome Prediction may also be displayed on objects not routinely used to communicate information—for example, on a pair of sunglasses, on a cape or other item of apparel, on a tattoo, buzzed into a haircut, etc. To achieve this, every Disguise Element may feature an entry field into which the user may enter his Outcome Prediction. Alternatively or additionally, the user simply selects any given Disguise Element as the object with which the platform communicates the Outcome Prediction. The Outcome Prediction may be still or in motion (i.e., it may scroll across the display surface, appear and disappear, etc.) The display surface may also be formed by various visuals which are not worn or held by the avatar but surround it, such as on a television or in the form of fireworks. In one variation, the Outcome Prediction shows an animation of the subject of the Outcome Prediction—for example, if the Outcome Prediction is that a given athlete will run a given distance during a game, the Outcome Prediction, as displayed, will show that athlete running that distance in the form of a short video.

In one embodiment, the Outcome Prediction is initially graphically concealed. The technique of concealment may be selected by the user or automatically applied by the platform depending on the display surface or object selected. One concealment technique may be the mere ommission of the Outcome Prediction. Another may be a blurring, darkening, or distortion effect applied onto the Outcome Prediction text. Distortion effects may also include the superimposition of another object or filter in front of the Outcome Prediction. The platform may also provide concealment techniques depending on the object on which the display surface is positioned. For example, if the display surface is a television, the television may be turned off, or if the display surface is on a book, the book may be closed. If the display surface were to appear in the form of fireworks in some proximity to the avatar, the fireworks would be in a latent form, perhaps residing in unused cartridges at the avatar's feet. If the display surface were a poster, curtains or blinds may initially be covering the poster.

In one embodiment, users may submit guesses as to the identity of the disguised avatar of the NFT Avatar. In one variation, the first user(s) who successfully guesses the identity of the disguised avatar win legal rights to the NFT Avatar. In another variation, the concealed Outcome Prediction is revealed to user(s) who successfully guess the identity of the disguised avatar. Reference to the first user to successfully guess the avatar identity may be added to the blockchain of the NFT Avatar. Once the identity of the disguised avatar is correctly guessed, the NFT Avatar may be further modified such that the identity is emblazoned or otherwise graphically displayed (including audio recitations of the identity).

In one variation, the Outcome Prediction is concealed until a designated time prior to the game event. In another variation, users who successfully guess the identity of the disguised avatar are given the option of accepting the Outcome Prediction as the user's own Outcome Prediction for the referenced game event. In yet another variation, purchasers of an NFT Avatar have the option of whether, when, and to whom the Outcome Prediction is revealed.

In one embodiment, if the identity of the disguised avatar of the NFT Avatar is not guessed by any of the users, the NFT Avatar is put on auction, and the highest bidder is sold legal ownership of the NFT Avatar. Accordingly, the platform may display the NFT Avatar, or a set of NFT Avatar and receive live bids with an indication as to the time remaining for bidding. In one variation, the identity of the NFT Avatar is not revealed until after a winning bid has been secured. In another variation, the NFT Avatars are put up for auction at a designated time prior to the game event. The blockchain may be modified to reflect that the NFT Avatar has been purchased.

In one embodiment, once the identity of the avatar is corrected predicted, or after a designated time has passed, or if the NFT Avatar has been purchased, the identifying information embedded in the avatar will be revealed. This may involve the removal, or at least the reorientation of Disguise Elements, the reconfiguration of the avatar in order to show identifying information such as the face, or a combination thereof. These changes may be preselected by the creator in order to maximalize the aesthetic and dramatic qualities of the avatar.

In one embodiment, NFT Avatars may be purchased using cryptocurrency. In one variation, the cryptocurrency accepted by the platform is a cryptocurrency native to the platform and which is awarded to users whose Outcome Predictions are correct.

In one embodiment, if a user purchases or otherwise wins an NFT Avatar, the user may then adopt the avatar of the NFT Avatar as his own avatar for use on the platform or elsewhere. In one variation, the avatar may be subsequently modified by the purchasing user. Such modifications may include: the removal of existing or attachment of new Disguise Elements, the embedding of additional Outcome Predictions, and so on.

In one embodiment, users may view the NFT Avatar's owned or otherwise won by other users. A user's collection of NFT Avatars may appear in a virtual or otherwise graphical room, with the room resembling a museum or gallery. A so-called visiting user may view and interact with the NFT Avatars, which may display in animation transitions between their disguise and reveal, Prediction Outcome and the actual outcome (as will be described below). Offers may be made by visting users to purchase any of the NFT Avatars in the collection, with the offers communicated to the owner of the collection (who may in turn accept, reject, or counteroffer). The platform may capture a percentile of each additional sale of NFT Avatars. The original creators may also designate a percentile of each additional sale of their NFT Avatar which the platforms will pay or facilitate the payment of to the creator. This creator-designated percentile may be incorporated into the NFT Avatar itself, both on the blockchain as well as in the form of a graphical element.

In one embodiment, the actual outcome of the game event is embedded into the NFT. The incorporation of the outcome may be accomplished graphically, by displaying the outcome adjacent to the Outcome Prediction. The outcome may appear in the same or different font as the Outcome Prediction. The Outcome Prediction may also be modified—for example, if the Outcome Prediction is found to have been incorrect, it may be graphically crossed out. In one embodiment, various aspects of the avatar may be modified by the platform. If the Outcome Prediction is found to have been incorrect, the avatar may frown, the eyes may cross, the head may sway back and forth dismally, or some other facial expression may indicate disappointment or shame resulting from the said failure. Graphical animations may also be embedded into the avatar—for example, a hand may (repeatedly) slap the avatar's face, the avatar and all of its accoutrements may crumble into dust, the object used to host the display surface, such as a laptop, television screen, etc., may crack. Failure may also be communicated via audio—for example, a voice may shout "wrong" in an obnoxious manner, a buzzer may buzz, or sad music may play.

Conversely, if the Outcome Prediction is found to have been correct, more positive expressions may be displayed. The avatar may smile, the head may nod approvingly, balloons may be let loose, or etc. Audio communications may also be used—for example, festive, victorious, or otherwise congratulatory music may play, a voice may shout "amazing" in an uplifting manner, or a bell may "ding ding ding", etc.

The form in which the Outcome Prediction is expressed as correct or incorrect may be set by default based on the object on which the display surface is applied, or may be set by the user during creation of the NFT Avatar. The actual outcome, and whether the Outcome Prediction was correct or incorrected, may be added to the blockchain of the NFT Avatar.

The Outcome Predictions of the NFT Avatars may also be compared by the system with respect to the actual outcomes. The platform may distinguish the NFT Avatars featuring the most accurate Outcome Predictions using an assortment of graphical and/or audio features. The avatar of a winning NFT Avatar may be adorned in a crown, littered with gold, highlighted, or obtain any other modification that conveys victory or excellence. It is expected that these winning avatar's would demand a higher price at auction and/or during a resell.

The system may detect the outcome of a game event by engaging with an external platform or databases via APIs, with the system configured to capture game event data and statistics, interpret the data and statistics, analyze the data and statistics, and produce game event outcomes in a form that matches or can be easily compared with Outcome Predictions. Alternatively or additionally, the outcomes may be entered into the system by users, including administrative users.

DETAILED DESCRIPTION

Figure 1:
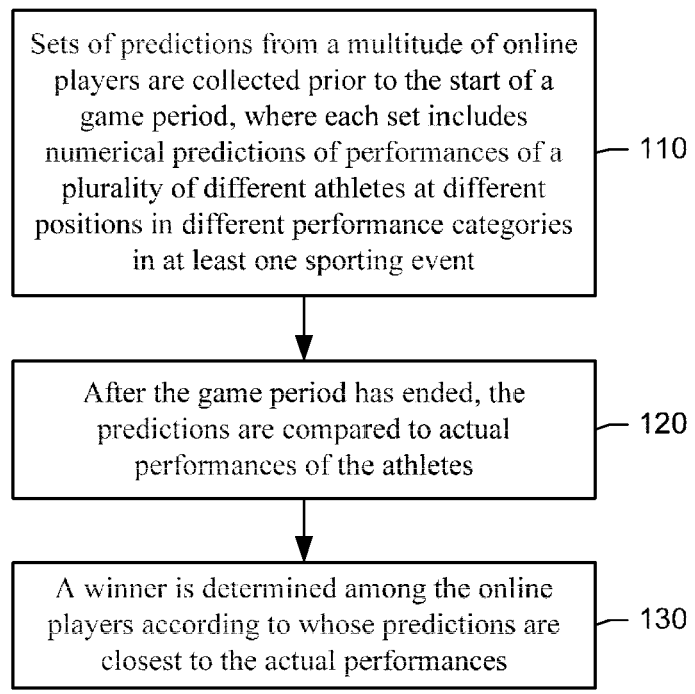
FIG. 1 is an illustration of an online game of skill.

Reference is made to FIG. 1, which illustrates an online game of skill. The game is one of skill because the outcome is determined mainly by mental skill of online players, rather than by chance.

At block 110, sets of predictions from a multitude of online players are collected prior to the start of a game period. Each set includes numerical predictions of performances of a plurality of different athletes at different positions in different performance categories in at least one sporting event.

Examples of sporting events include, without limitation, team sports such as football, baseball, basketball, soccer, and hockey. Further examples of sporting events include, without limitation, individual sporting events such as boxing, mixed martial arts (MMA), and horse racing. Sporting events may be professional and/or collegiate. Sporting events may be real events and/or eSports. eSports as used herein refer to video games such as League of Legends and Counter-Strike.

Those people participating in real sporting events are referred to a athletes. For instance, Tom Brady, quarterback of the New England Patriots, is an athlete. Those people playing and competing in eSports (as themselves or as game characters) are also referred to as athletes. Thus, an athlete as used herein may be real or virtual.

As used herein, the term "multitude of players" means at least on the order of thousands of players. The multitude of players could be thousands of players, tens of thousands of players, hundreds of thousands of players, or more.

As used herein, a "game period" refers to a period of time during which a roster of athletes performs only once. Each of the at least one sporting events occurs only once during the game period. Consequently, an athlete will perform only once during the game period. In baseball, the performance may be daily. In football, the performance may be weekly.

As used herein, a performance category refers to the acts being predicted. For example, if a selected athlete is a quarterback, performance categories may include passes attempted, passes completed, passing yards, and passing touchdowns. An online player predicts a number for each of these categories. If a selected athlete is a basketball player, performance categories may include number of points scored, number of assists, number of rebounds, and number of steals.

The online players may select rosters of athletes at different positions, where each position has its own performance categories. Each sport may have tens or hundreds of possible performance categories. The following tables provide examples of rosters and performance categories for different sporting events. The numbers in parentheses represent the number of athletes selected.

TABLE 1

| NFL Football | |
| --- | --- |
| Quarterback (1) | Pass Attempts |
| | Pass Completions |
| | Passing Yards (Total) |
| | Passing Touchdowns |
| Running Backs (2) | Rushing Attempts |
| | Rushing Yards |
| | Rushing Touchdowns |
| Wide Receiver (1) | Receptions |
| | Receiving Yards |
| | Touchdown Receptions |
| Tight End (1) | Receptions |
| | Receiving Yards |
| | Touchdown Receptions |
| Flex Position (1): RB or WR or TE | Receptions |
| | Rushing Yards |
| | Receiving Yards |
| | Touchdowns |
| Defensive Unit (1) | Sacks |

TABLE 1-continued

NFL Football

| | |
|---|---|
| Kicker (1) | Interceptions<br>Field Goal Yardage<br>Points After Touchdown |

TABLE 2

Major League Baseball

| | |
|---|---|
| Pitcher (1) | Number of Innings Pitched<br>Number of Strikeouts |
| Batters (8): Catcher; 1st Base; 2nd Base; 3rd Base; Left Field; Center Field; Right Field | Number of Hits<br>Number of Runs Scored<br>Number of RBIs |

TABLE 3

NBA Basketball

| | |
|---|---|
| Point Guard (1) | Number of Points Scored |
| Shooting Guards (2) | Number of Assists |
| Small Forwards (2) | Number of Rebounds |
| Power Forwards (2) | Number of Steals |
| Center (1) | |

TABLE 4

Soccer

| | |
|---|---|
| Goalkeeper (1) | Number of Shots on Goal Against<br>Number of Goals Against<br>Number of Penalty Kick Saves |
| Forwards (2) | Number of Shots |
| Midfielders (2) | Number of Shots on Goal |
| Defenders (2) | Number of Goals |
| Flex Player (1): Forward, Midfielder or Defender | Number of Assists |

TABLE 5

NHL Hockey

| | |
|---|---|
| Goalies (2) | Number of Shots on Goal Against<br>Number of Goals Against |
| Centers (2) | Number of Shots on Goal |
| Left/Right Wingers (3) | Number of Goals |
| Defensemen (2) | Number of Assists |

TABLE 6 eSports

| | |
|---|---|
| Players (5): Top: Jungle; Mid; ADC; Support | Kills<br>Assists |
| Flex player (1) | Kills<br>Assists |
| Team Slot (1) | Turrets<br>Dragons<br>Barons |

A set of predictions is not limited to athletes from the same team in the same sporting event. Each online player is free to select athletes from across different teams, as long as the athletes perform during the same game period. A player may select an athlete once per game period.

At block 120, after the game period has ended, the predictions are compared to actual performances of the athletes. At block 130, a winner is determined among the players according to whose predictions are closest to the actual performances. For instance, the online player whose aggregate predictions come closest to the aggregate actual performances is declared the winner. Consider the following simple example involving two players: A first player selects a quarterback and predicts that the quarterback will complete 8 of 12 passes for 150 yards and 1 touchdown. A second player selects the same quarterback, and makes a prediction of 7/12 for 120 yards and 0 touchdowns. During the game period, the quarterback actually completes 6 of 12 passes for 150 yards and 3 touchdowns. The first player's aggregate predictions come closest to the aggregate actual performances. Therefore, the first player wins.

In real situations, there will be multitudes of players, each submitting numerical predictions for different athletes playing different positions. The examples in the tables above are more representative of the predictions by each of the multitude of players.

The game of FIG. 1 may be used to perform data analytics for a daily fantasy sports game.

Figure 2:
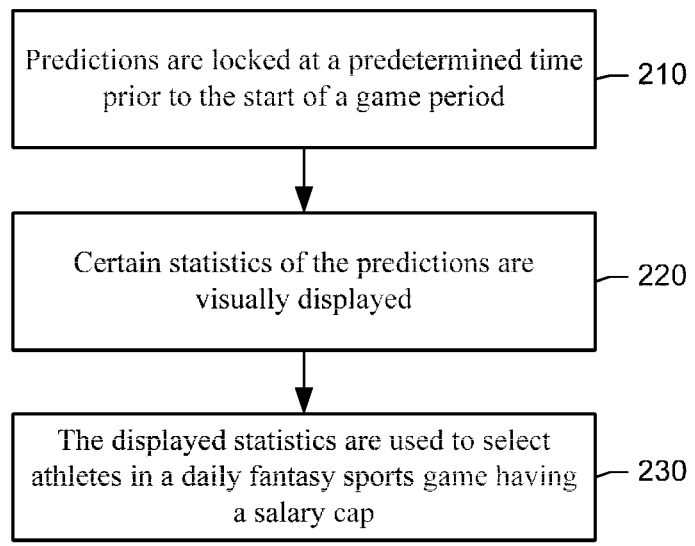
FIG. 2 is an illustration of a method of performing data analytics for a daily fantasy sports game.

Reference is now made to FIG. 2, which illustrates a method of using the game of FIG. 1 to perform data analytics for daily fantasy sports games. At block 210, the predictions are locked at a predetermined time prior to the start of the game period. This means that online players are locked out from submitting and/or changing their predictions.

At block 220, certain statistics of the predictions are visually displayed to all of the players after the predictions have been locked, but prior to the start of the game period. For example, the statistics may include a statistical mode, which represents the numerical prediction that is most commonly submitted by players for each performance category, for each athlete, in each sport, each game period. These analytics can offer visibility into which active athletes are trending that day. They can provide insight as to who other people deem the most desirable athletes to draft.

Displayed statistics such as modes may be used as trending data to aid in salary cap valuations. The modes indicate how other online players will value an athlete versus that athlete's salary cap figure.

At block 230, the online players may use the displayed statistics to select athletes in a daily fantasy sports game having a salary cap. For instance, the online players may use the analytics to decide on how much salary cap money to spend on particular athletes on all other fantasy sites that impose a salary cap.

For rookie contestants and novices, the displayed statistics may serve as a simple, instructive guide for learning why a majority of other online players make particular predictions. This guide may give online players who are rookie contestants and novices the confidence to enter into daily fantasy sports games.

The time at which the predictions are locked and the statistics are displayed should be sufficient to allow the online players to use the statistics to play one or more daily fantasy sports games that impose a salary cap. For instance, this might be fifteen minutes to an hour before the start of a game period.

Figure 3:
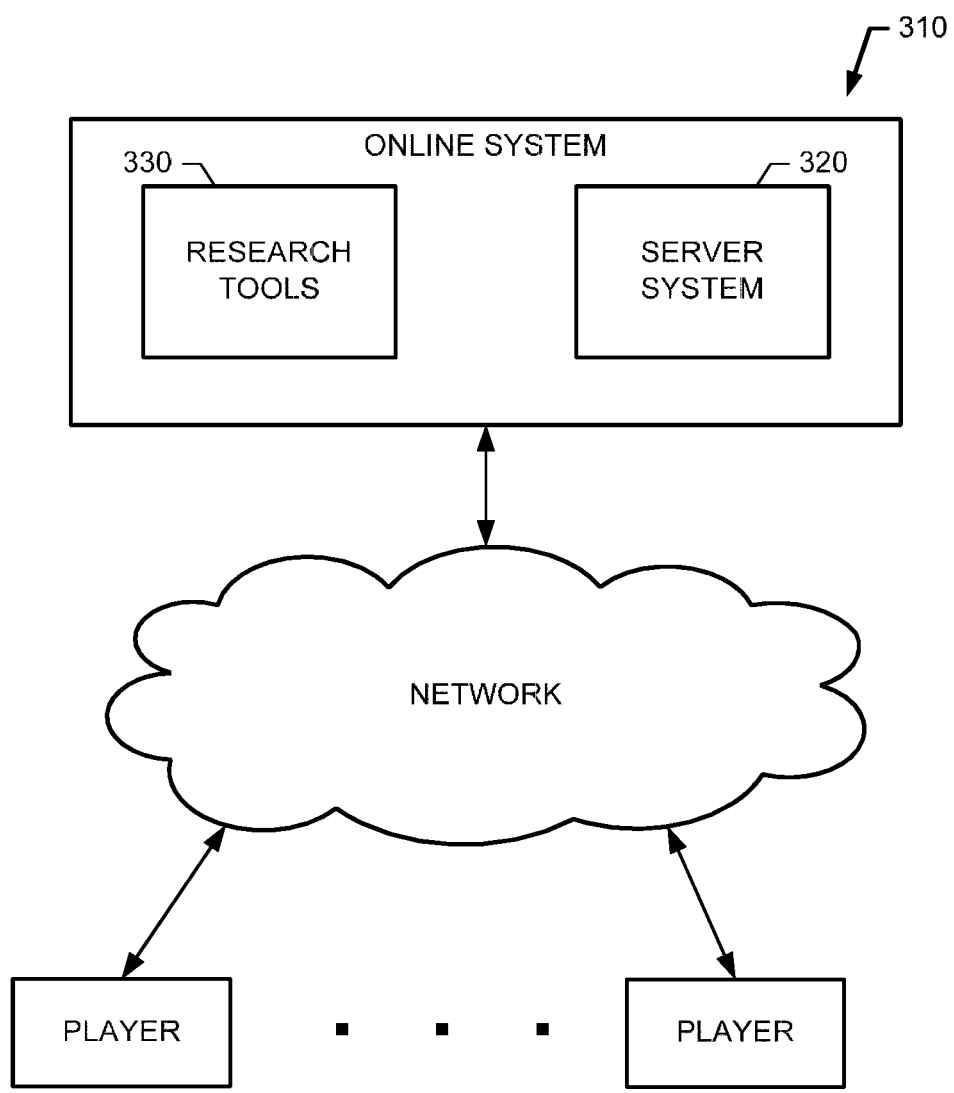
FIG. 3 is an illustration of a system for performing the data analytics.

Reference is now made to FIG. 3, which illustrates an online system 310 for performing the data analytics for daily fantasy sports games. The online system 310 includes a server system 320 programmed to perform the methods of FIGS. 1 and 2. Thus, the server system 320 enables a multitude of players to log in via a network, choose at least one sport in which to compete, draft a roster of athletes, and submit numerical predictions for each performance category.

The server system 320 then collects sets of predictions from the multitude of online players prior to the start of game time; locks the predictions at a predetermined time prior to the start of the game period; visually displays statistics of the predictions to all of the players after the predictions have been locked, but prior to the start of the game period; compares the predictions to actual performances of the athletes after the game period has ended; and determines a winner among the players according to whose predictions are closest to the actual performances. The server system 320 may also determine one or more runner ups. The server system 320 or another system may make a payout to each winning player and runner up.

The online system 310 may include traditional research tools 330. The traditional research tools 330 may provide information for formulating the predictions. This information may include, without limitation, historical performance of athletes, information about home field advantage, strengths/weaknesses of opponents, game plans, injury reports, weather, etc. The traditional research tools 330 may also be provided by third party vendors.

Figure 4A:
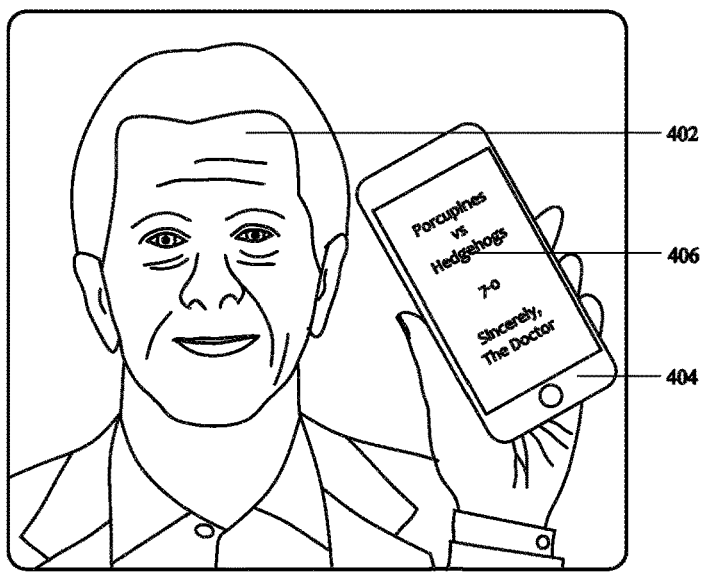
FIG. 4a shows an exemplary avatar.
Figure 4B:
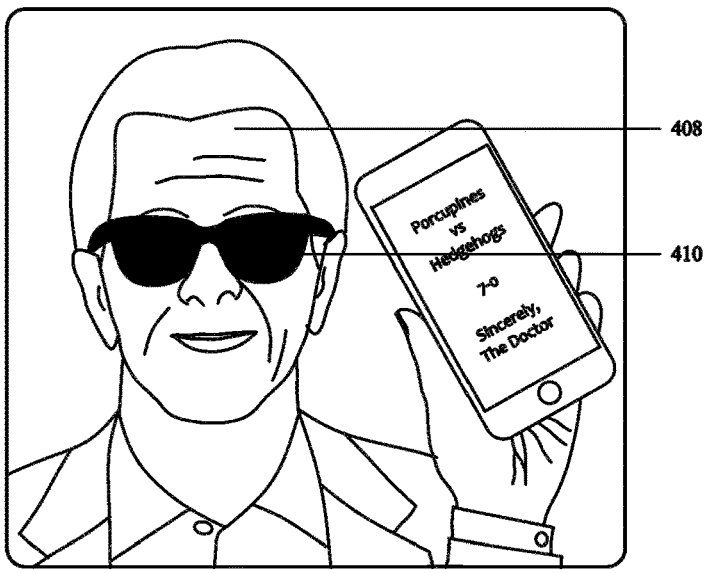
FIG. 4b shows an exemplary avatar with a set of Disguise Elements to conceal a creator identity and a concealed Outcome Prediction.
Figure 4C:
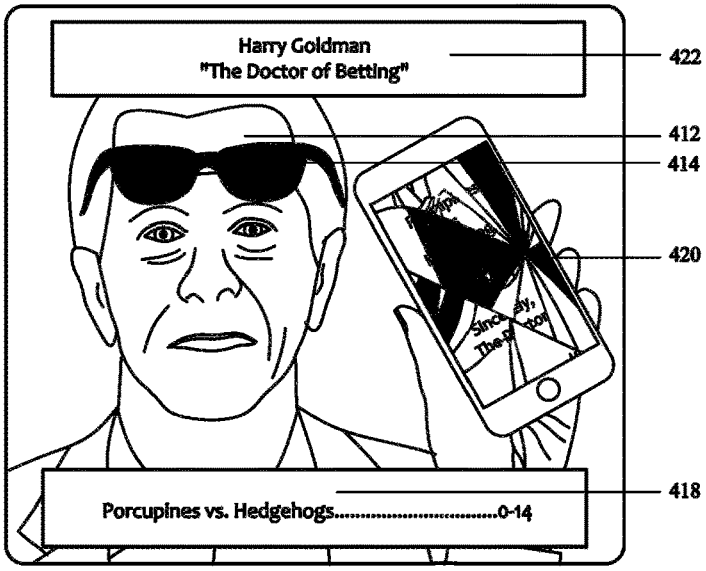
FIG. 4c shows an exemplary avatar with the Disguise Elements modified to reveal the creator identity and a revealed Outcome Prediction.

As shown in FIG. 4a-c, a digital avatar may comprise an undisguised avatar 402 when the avatar data is initially submitted into the system, Flavor Elements 404 into which an Outcome Prediction 406 may be embedded, a disguised avatar 408 after the Disguise Elements 410 are embedded in the avatar, and at a revealed avatar 412 after the Disguise Elements have been modified or removed 414. It may additionally comprise an actual outcome display 418, a success indication 420, and an identification of the user behind the avatar 422.

Figure 5:
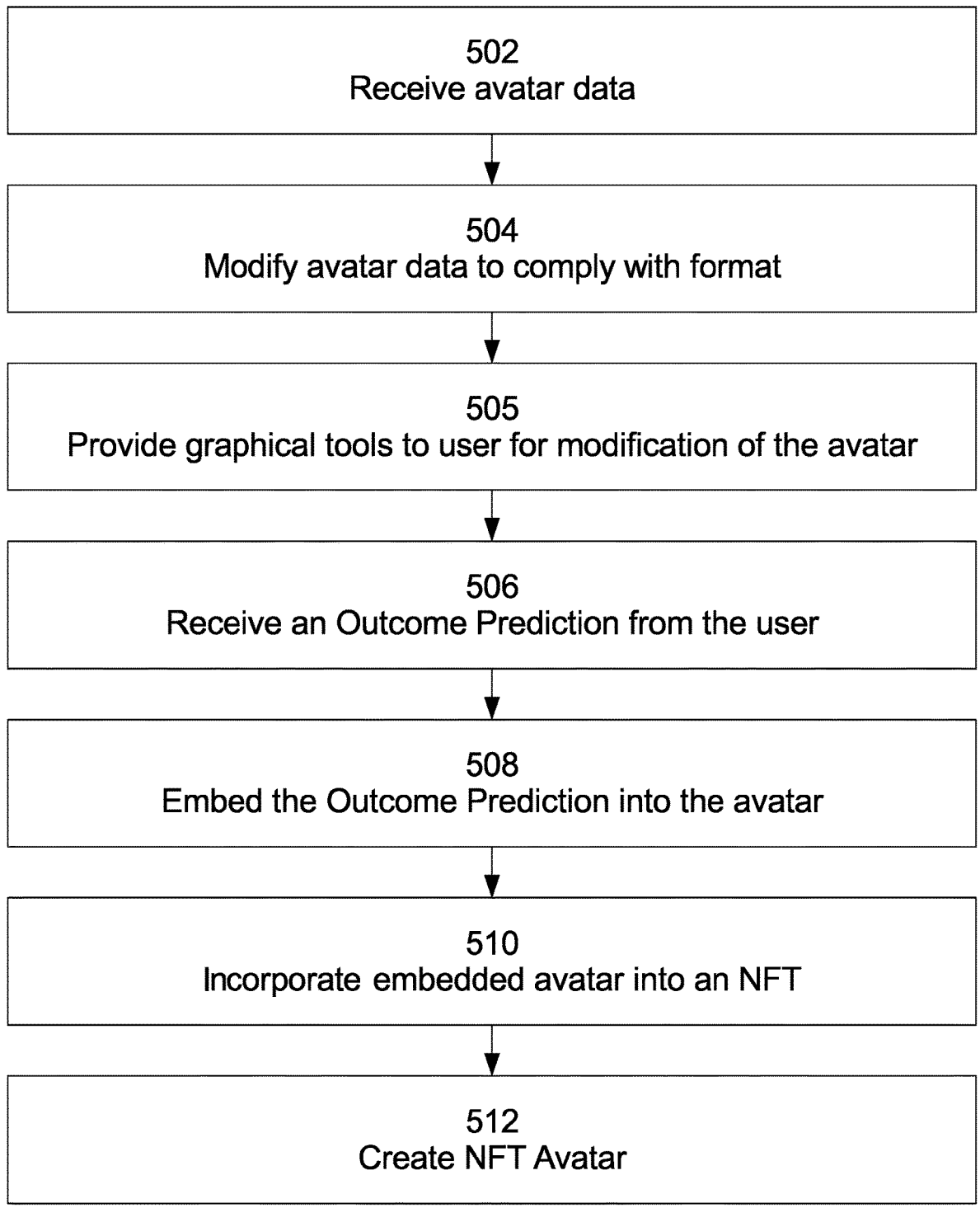
FIG. 5 shows an exemplary method of creating an NFT Avatar.

As shown in FIG. 5, the platform may receive avatar data from a user 502. The platform may then modify the avatar data in order for the avatar to comply with platform consistency rules and proper formatting 504. The playform may then provide graphical tools for the user to further modify the avatar 505. The platform may receive an Outcome Prediction from the user 506 and embed the Outcome Prediction into the avatar 508. The platform may incorporate the embedded avatar into an NFT 510 in order to create NFT Avatars 12.

Figure 6:
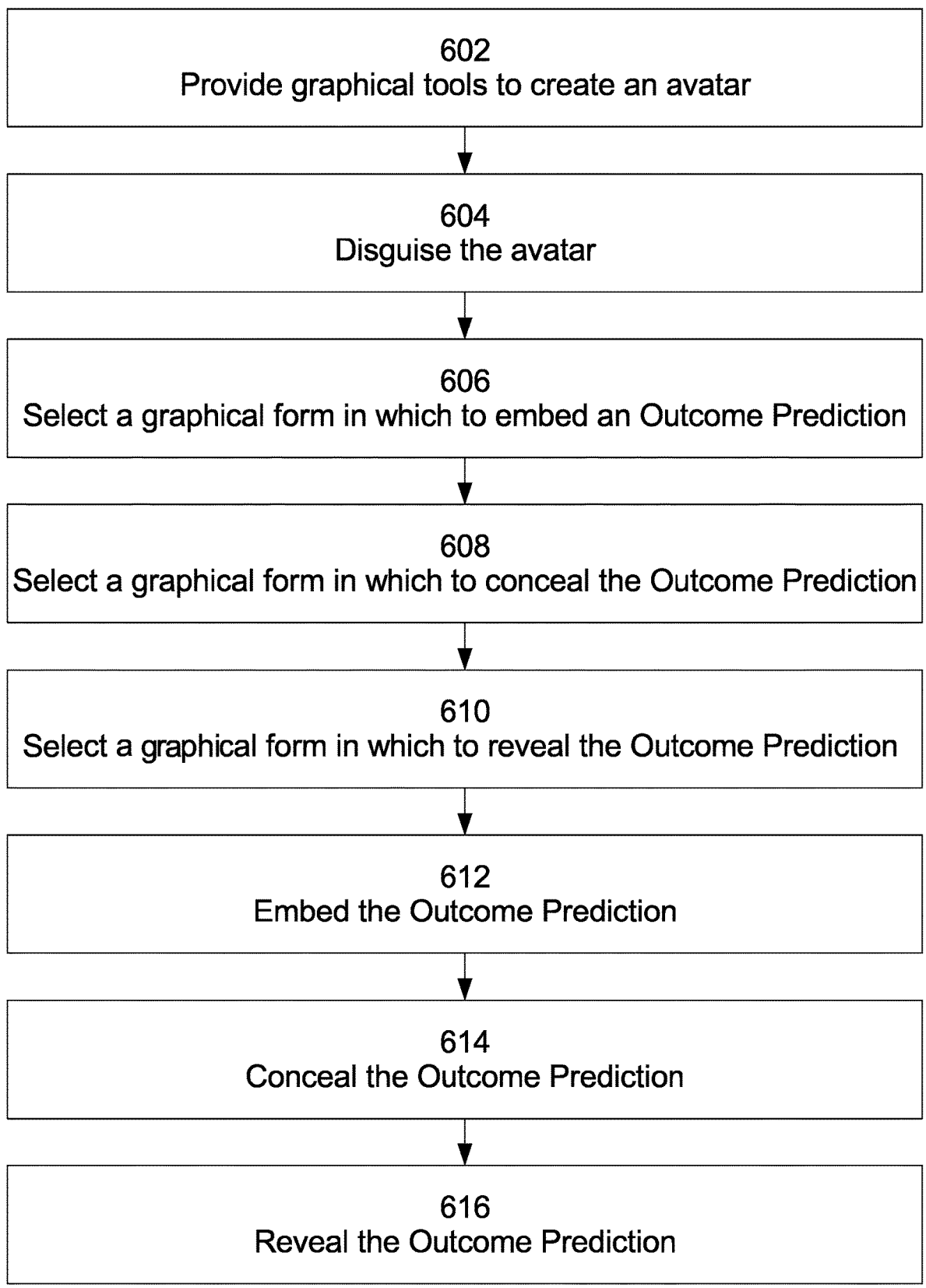
FIG. 6 shows an exemplary method of creating an disguising an Avatar and receiving an Outcome Prediction.

As shown in FIG. 6, the platform may provide a set of graphical tools to enable a user to create an avatar 602, disguise the avatar 604, select a graphical form in which to embed an Outcome Prediction 606, select a graphical form in which the conceal the Outcome Prediction 608, select a graphical form in which to reveal the Outcome Prediction 610, and embed the Outcome Prediction 612. Afterwards, the platform may conceal the Outcome Prediction 614, and at a later time reveal the Outcome Prediction 616.

Figure 7:
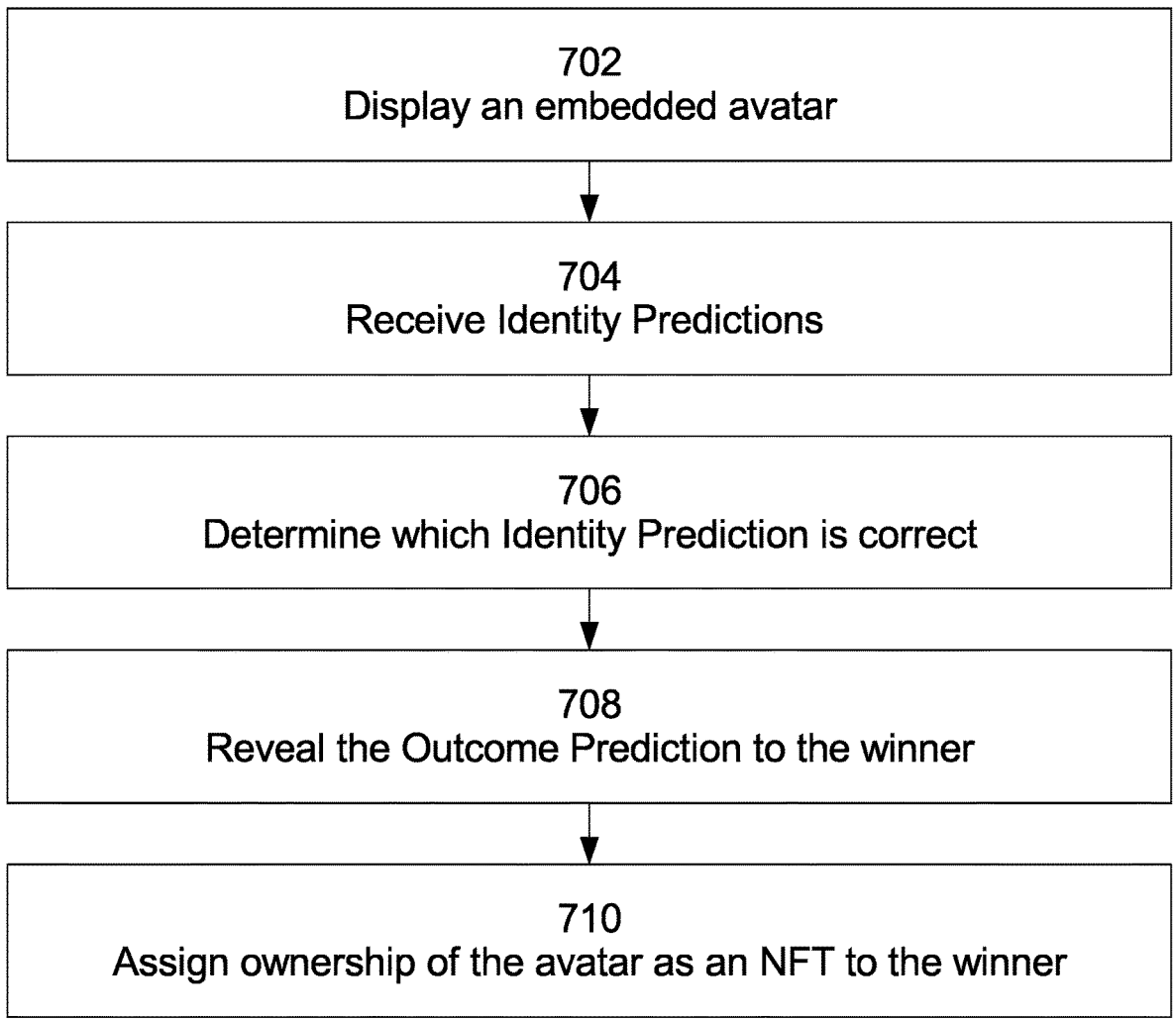
FIG. 7 shows an exemplary method of handling Identity Predictions.

As shown in FIG. 7, the platform may display an embedded avatar 702, receive Identity Predictions by users as to the owner of the embedded avatar 704, determine which Identity Prediction matches the identity of the owner of the embedded avatar 706, reveal the Outcome prediction to the winner 708, assign ownership of the embedded avatar as an NFT to the winner 710.

Figure 8:
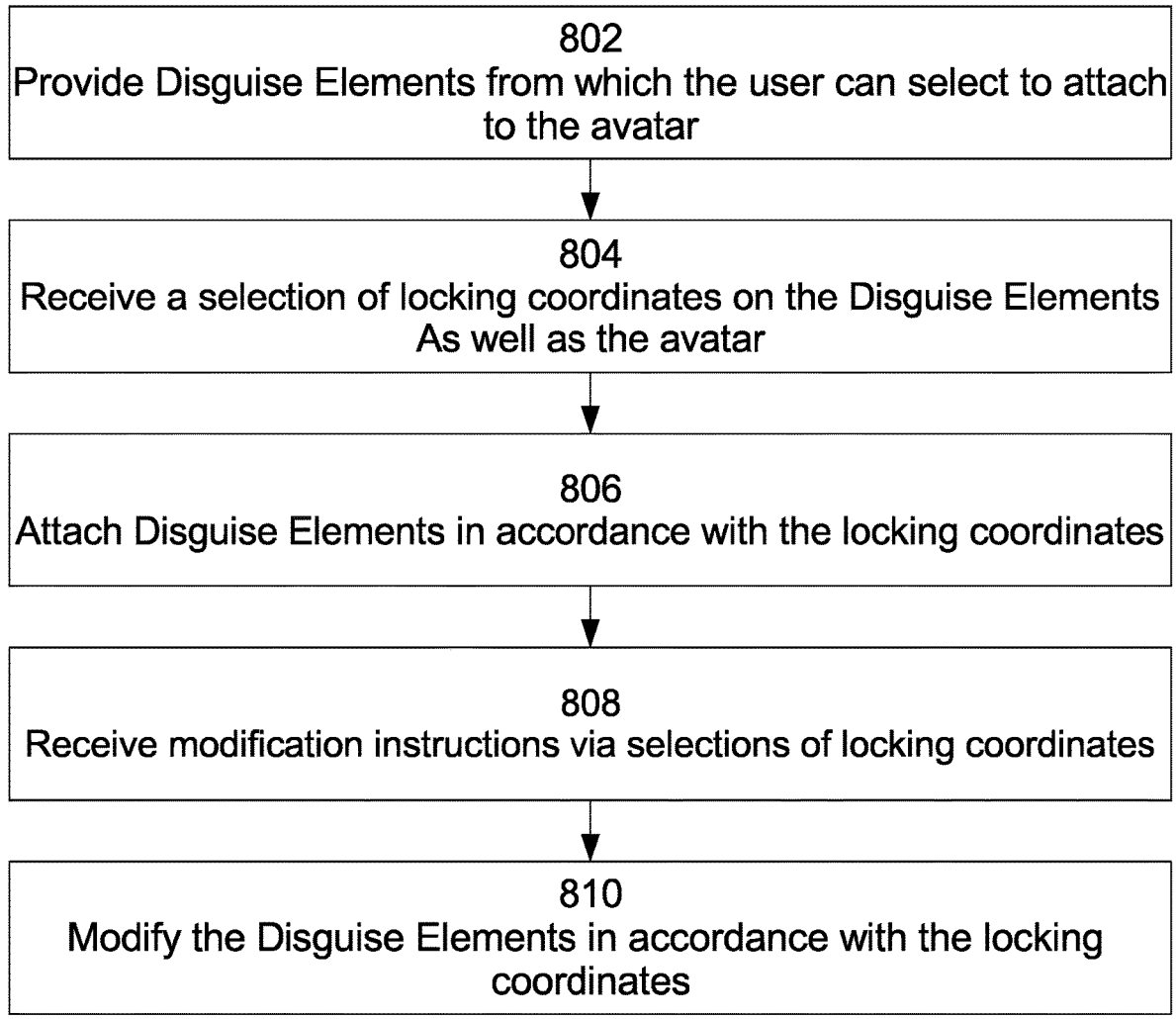
FIG. 8 shows an exemplary method of incorporating Disguise Elements.

As shown in FIG. 8, the platform may provide Disguise Elements from which the user can select to attach to the avatar 802. The platform may receive a selection of one or more locking coordinates on the Disguise Elements and an additional selection of one or more locking coordinates on the avatar 804. Then, the platform may attach the Disguise Elements onto the avatar in accordance with the locking coordinates 806. The platform may receive modification instructions from the user via selections of various locking coordinates on the Disguise Elements 808 and subsequently modify the Disguise Elements according to the locking coordinates selected 810.

Figure 9:
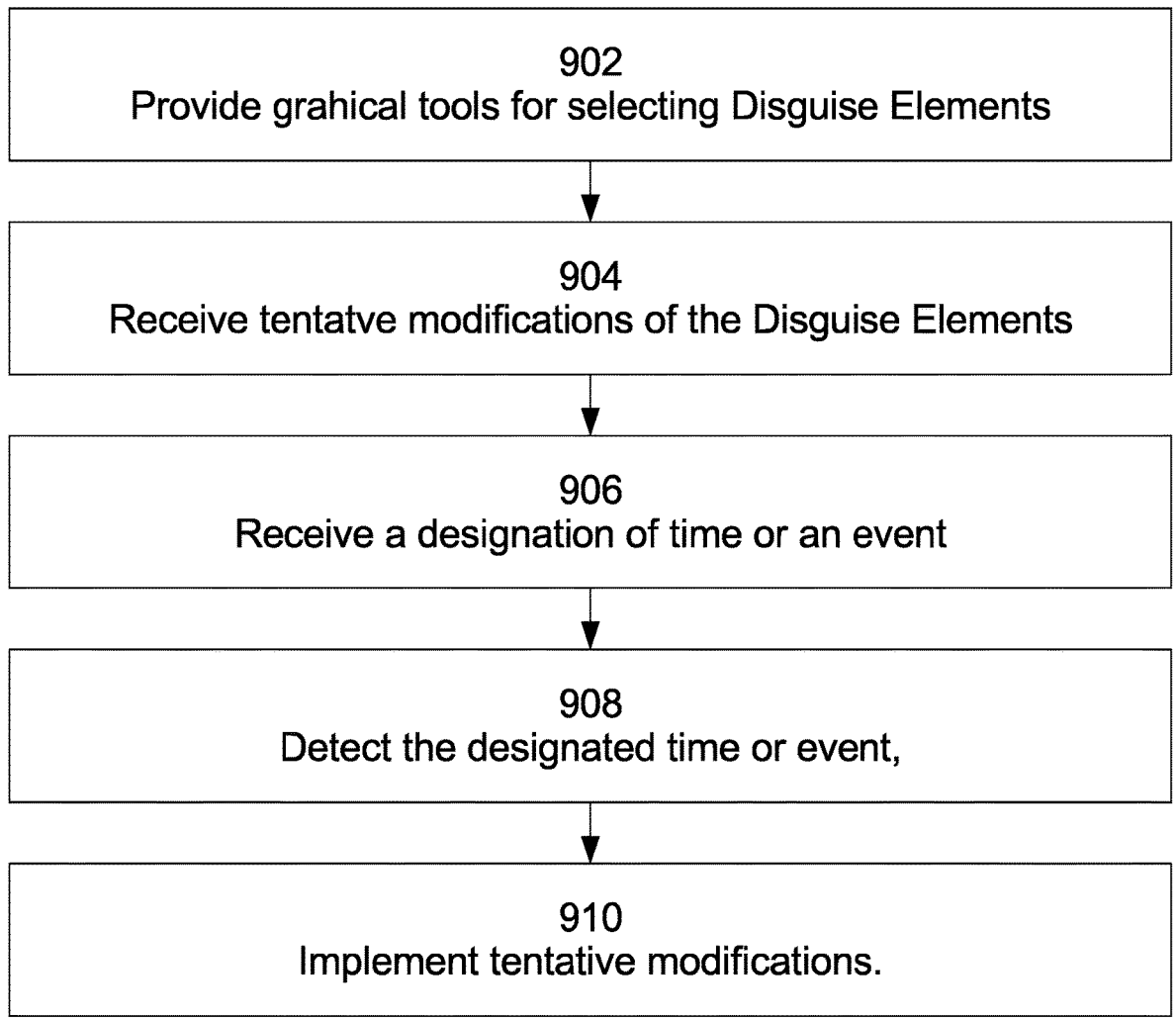
FIG. 9 shows an exemplary method of modifying the Disguise Elements so as to reveal identifying information.

As shown in FIG. 9, the platform may provide a set of graphical tools to enable a user to select a Disguise Element 902, receive tentative modifications of the Disguise Element from the user 904, receive a designation of a time or an event after which the tentative modifications will be implemented by the system 906, and then after the designated time or upon the occurrence of the event 908, remove or otherwise reorient or reconfigure the Disguise Element so that it no longer conceals the user's identifying information 910.

Figure 10:
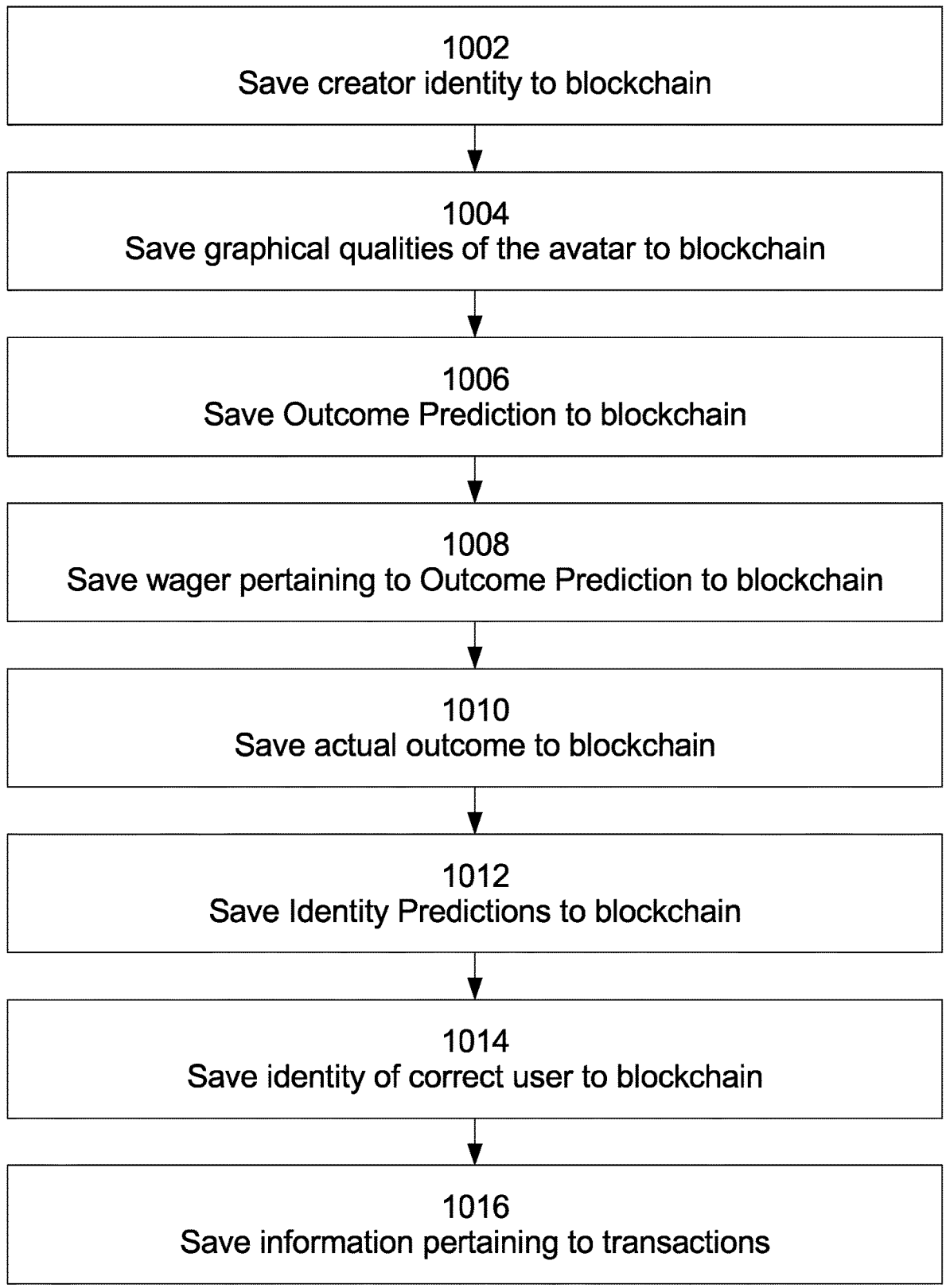
FIG. 10 shows an exemplary method of updating the blockchain of an NFT Avatar.

As shown in FIG. 10, the platform will save to a cryptocurrency blockchain the identity of the creator of an avatar 1002, the graphical qualities of the avatar 1004, the Outcome Prediction embedded by the creator 1006, the wager pertaining to the Outcome Prediction 1008, the Actual Outcome 1010, Identity Predictions directed toward the avatar made by other users 1012, the identity or username of a user whose Identity Prediction is correct 1014, and transactions involving the NFT Avatar 1016.

Figure 11:
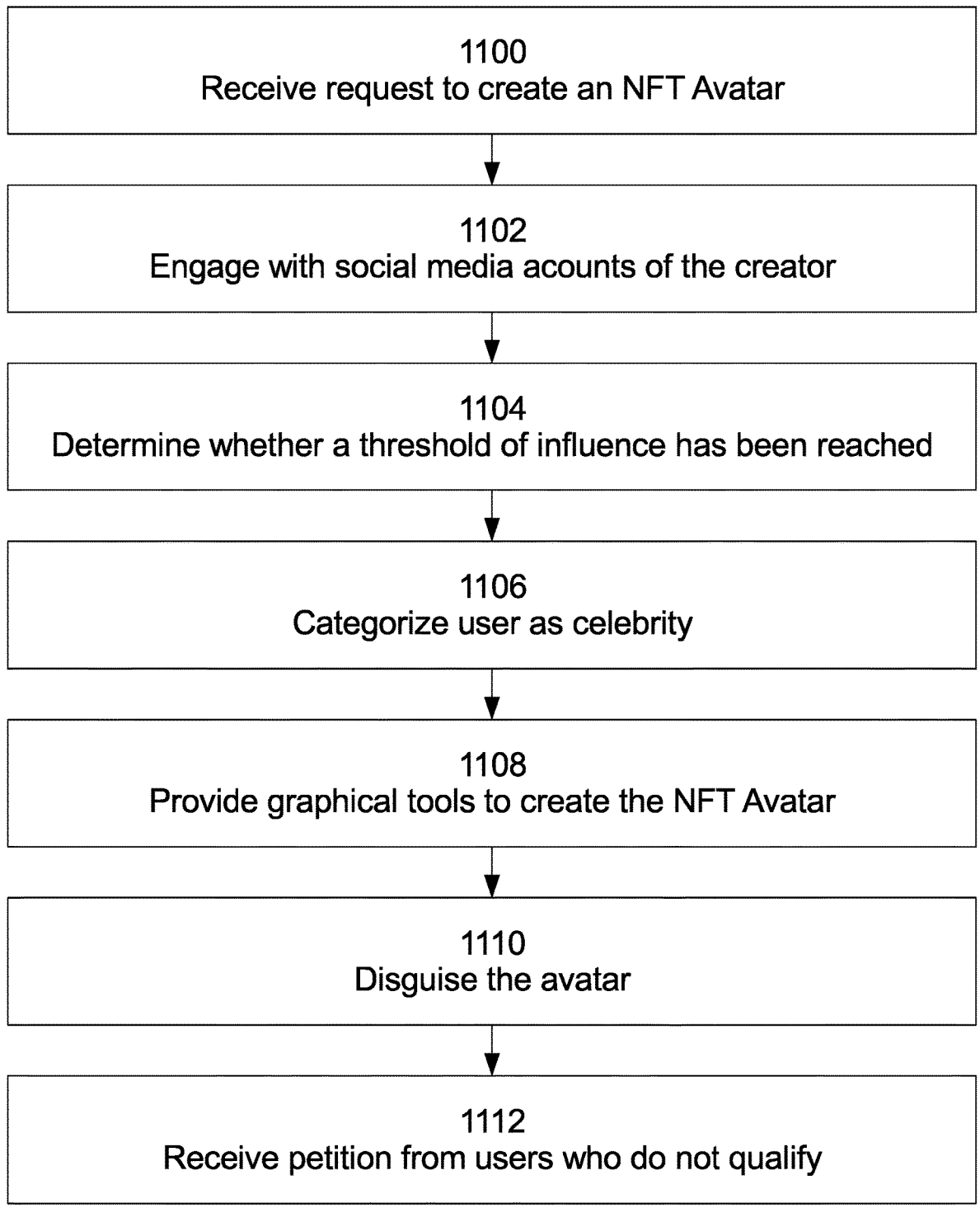
FIG. 11 shows an exemplary method of determining and handling celebrity categorization.

As shown in FIG. 11, upon receiving a request by a creator to create an NFT Avatar 1100, the playform may engage with social media accounts of the creator 1102, determine whether a threshold of influence or celebritydom has been reached 1104, and if so, categorize the creator as a celebrity 1106 and provide the creator the set of graphical tools to create the NFT Avatar 1108 and disguise the avatar 1110. Creators who the platform determines do not reach the threshold of influence, or creators who do not wish their social media accounts to be accessed by the platform, may submit a petition to the platform to be granted celebrity categorization and/or the rights accompanying it 1112.

Figure 12:
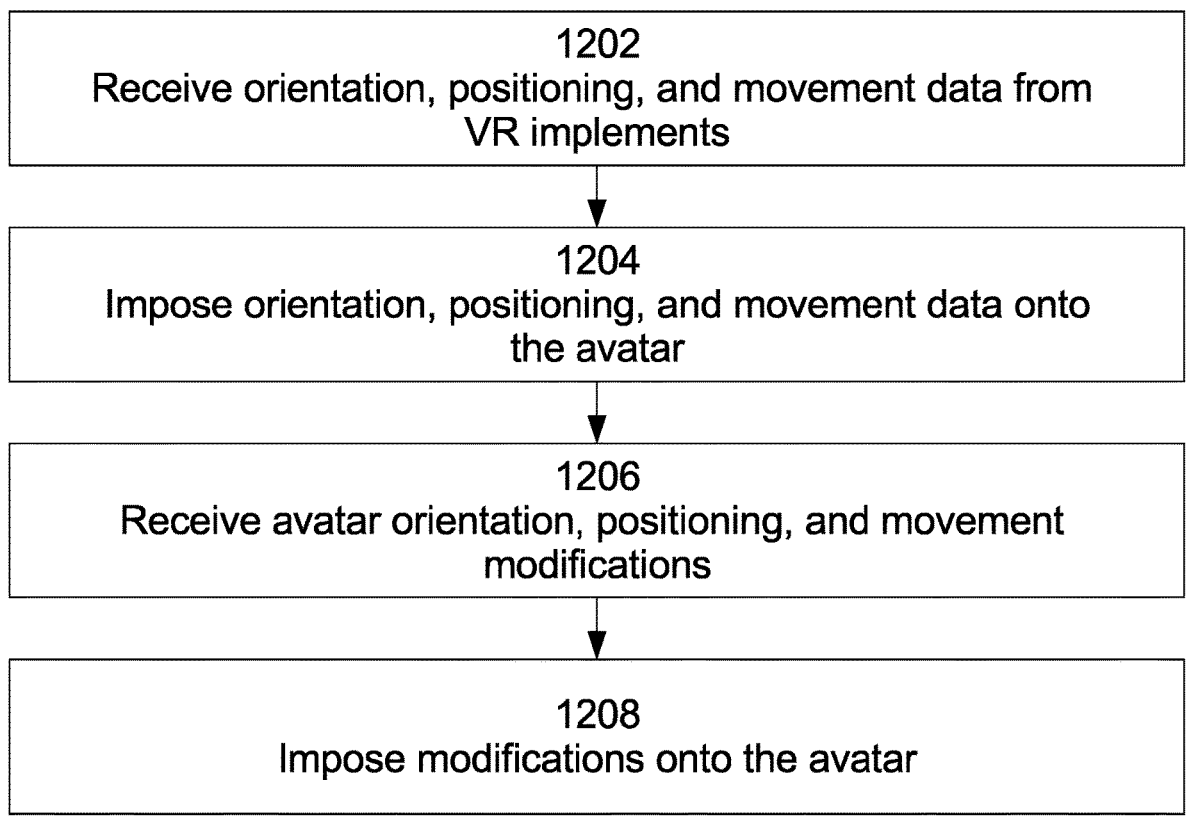
FIG. 12 shows an exemplary method of using virtual reality implements to create and modify avatars.

As shown in FIG. 12, upon receiving orientation, positioning, and movement data from VR implements 1202, the platform will impose the orientation, positioning, and movement onto the avatar 1204. Upon receiving avatar orientation, positioning, and movement modifications from the creator 1206, the platform will impose the modifications onto the avatar 1208.

Figure 13:
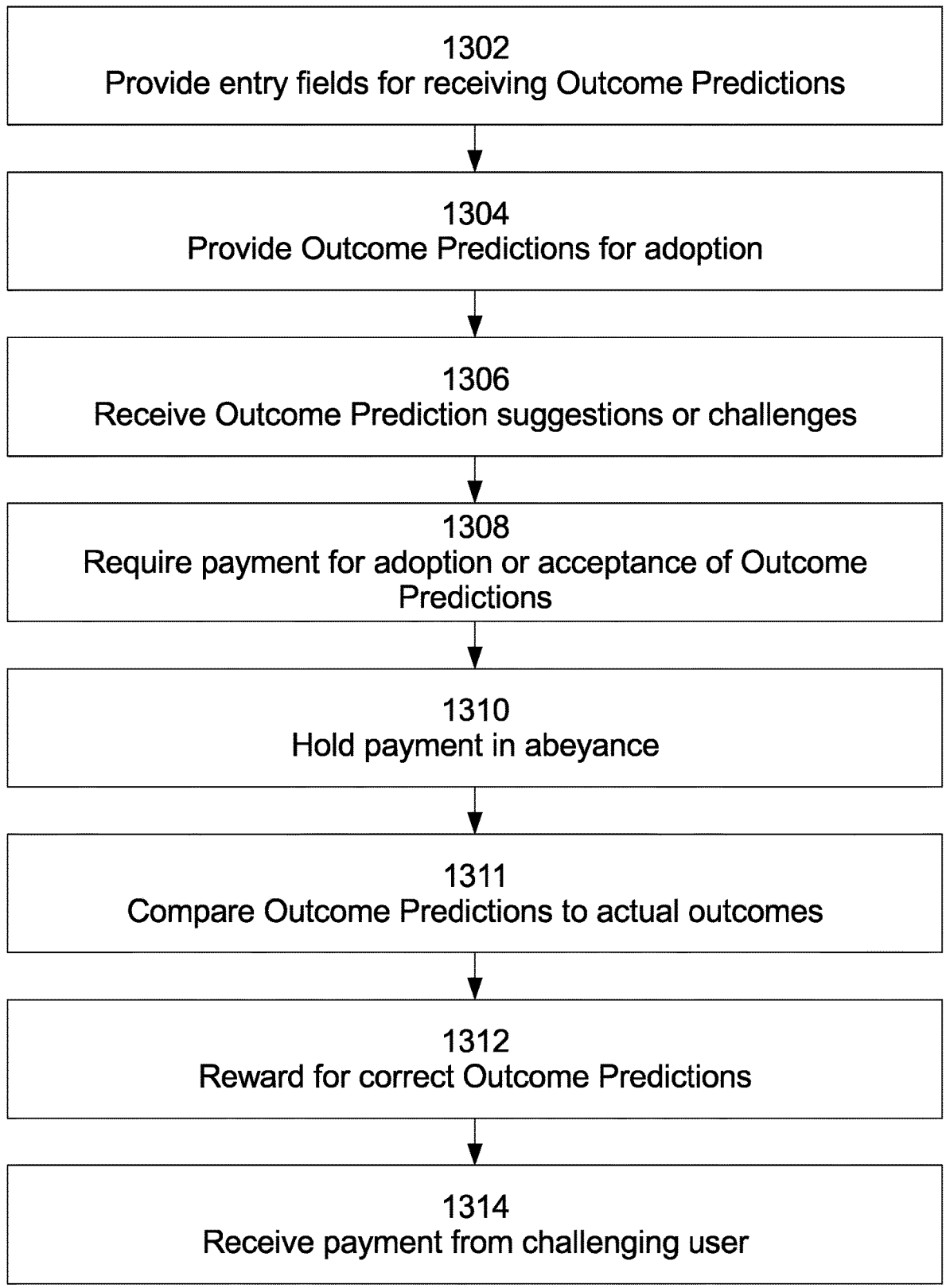
FIG. 13 shows an exemplary method of handling Outcome Predictions.

As shown in FIG. 13, the platform may provide entry fields for receiving Outcome Predictions from the users 1302. The platform may provide Outcome Predictions which the users may adopt as their own 1304. The platform may receive Outcome Prediction suggestions or challenged by one user and provide those Outcome Prediction suggestions or challenged to another user 1306 to accept or reject. The platform may require payment from a user in order to permit the user to submit, adopt, or accept Outcome Prediction submissions, suggestions, or challenges 1308, with the payment held in abeyance until the Outcome Prediction is determined to be correct or incorrect 1310. The platform may compare the Outcome Predictions to actual outcomes 1311 and reward users who have submitted, adopted, or accepted correct Outcome Predictions 1312 but keep payment if the Outcome Predictions are ultimately incorrect. The platform may also enable a user who has accepted an Outcome Prediction challenge from another user to receive payment from the challenging user 1314. In these examples, submitting, adopting, or accepting Outcome Predictions function as wagers.

Figure 14:
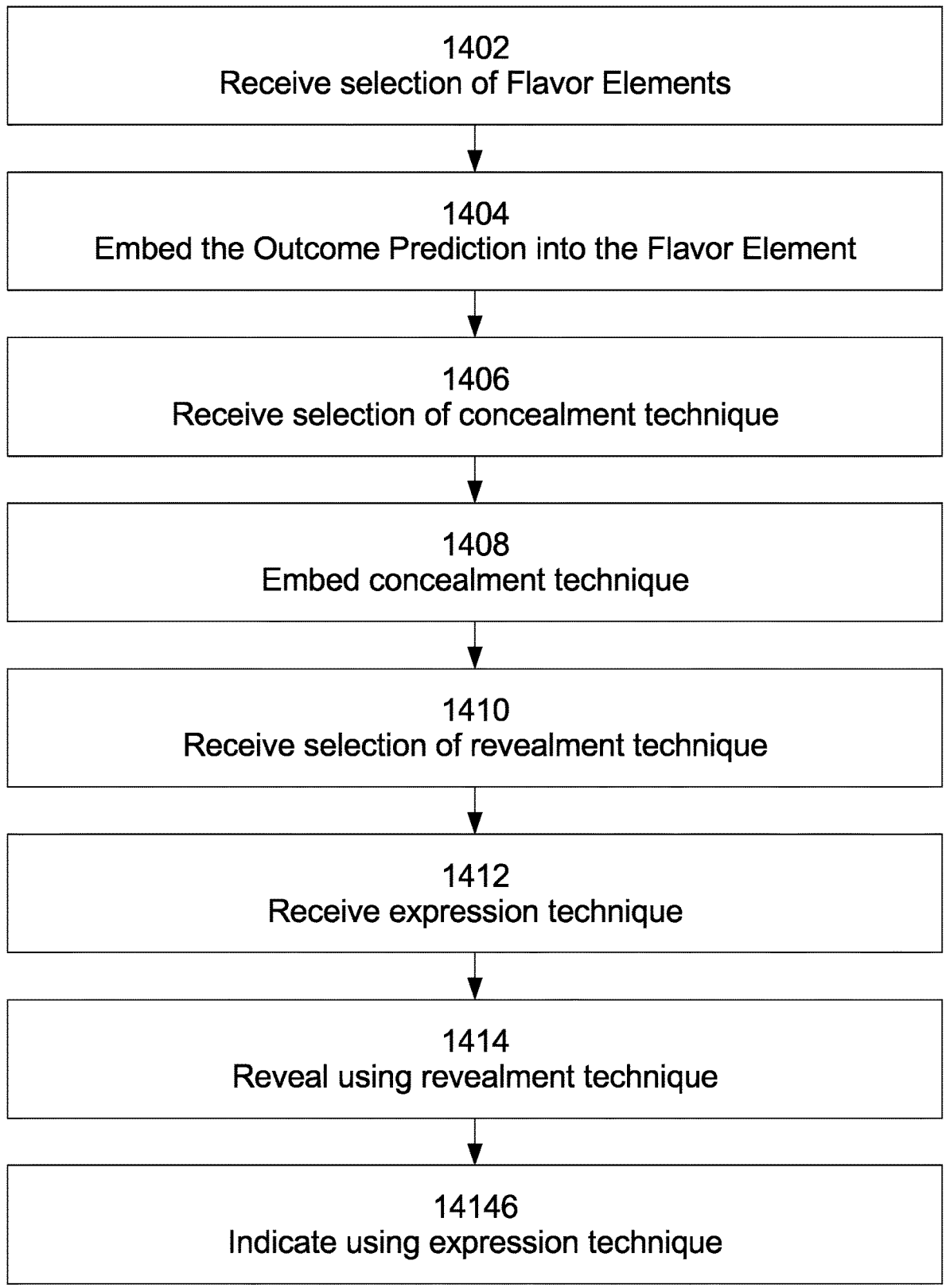
FIG. 14 shows an exemplary method of embedding and revealing Outcome Predictions.

As shown in FIG. 14, the platform may receive a selection by the creator of a Flavor Element onto which the Outcome Prediction is to be displayed 1402. The platform may then embed the Outcome Prediction into the Flavor Element

1404. The platform may receive a selection from the creator of a concealment technique or a modification of the Flavor Element so as to conceal the Outcome Prediction 1406, which the platform will then embed into the Flavor Element 1408. The platform may also receive a revealment technique or a modification of the Flavor Element so as to reveal the Outcome Prediction 1410. Further, the platform may receive a technique to express whether the Outcome Prediction was correct or incorrect 1411. Upon receiving a correct Identity Prediction from a user 1412, the platform will reveal the Outcome Prediction using the revealment technique 1414. After the actual outcome occurs, the platform will indicate whether the Outcome Prediction is correct using the expression technique 1416. While the above provides a disclosure for selection various techniques, the techniques can also be crafted using the graphical tools.

Figure 15:
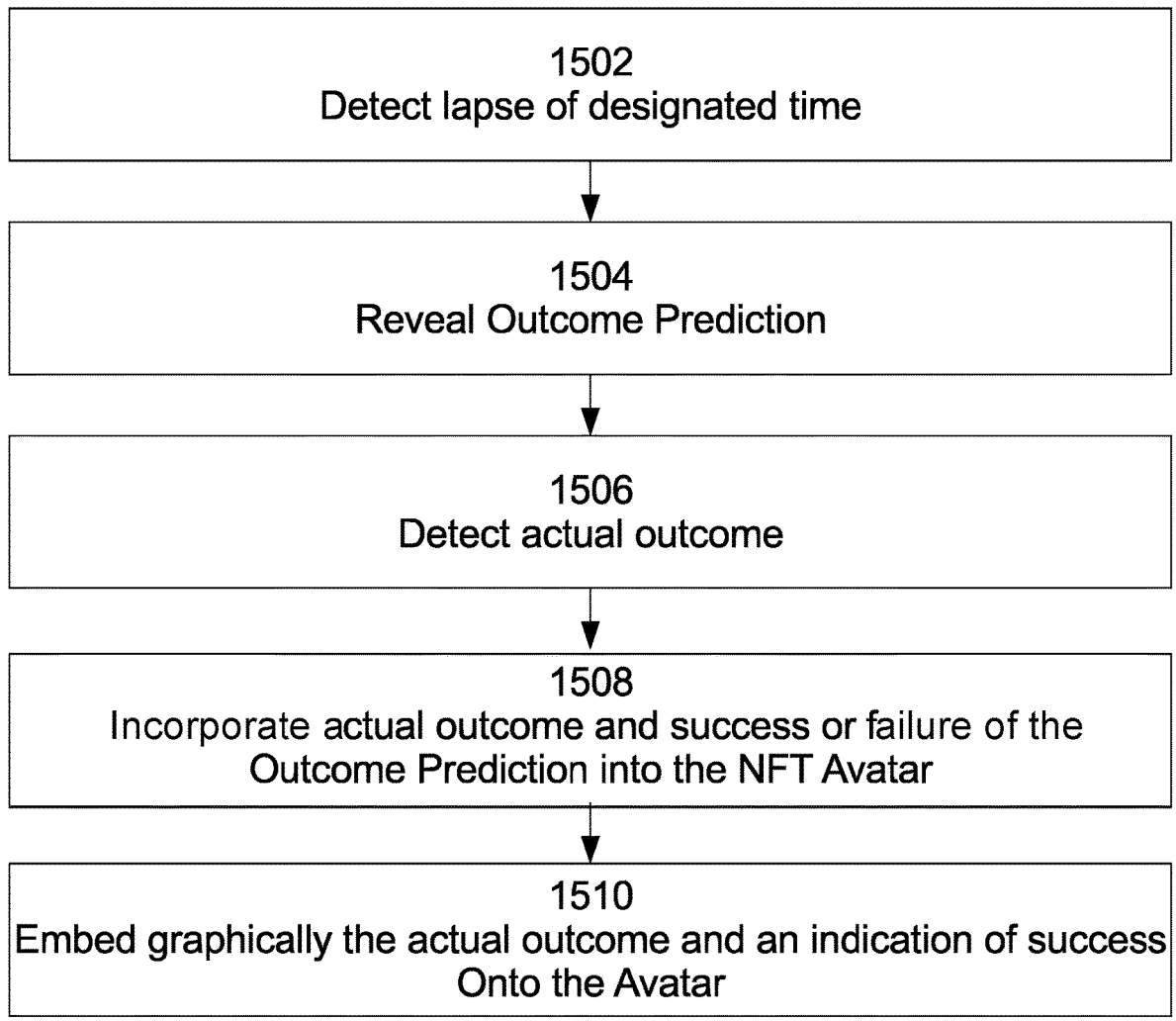
FIG. 15 shows an exemplary method of incorporating the actual outcome into the NFT Avatar.

As shown in FIG. 15, after a designated period of time elapses prior to a game event 1502, the platform may reveal the Outcome Prediction embedded in the Flavor Element 1504. Upon detecting the actual outcome 1506, the platform will incorporate the actual outcome and the success or failure of the Outcome Prediction into the NFT Avatar 1508 and embed graphically the same into the Avatar 1510.

Figure 16:
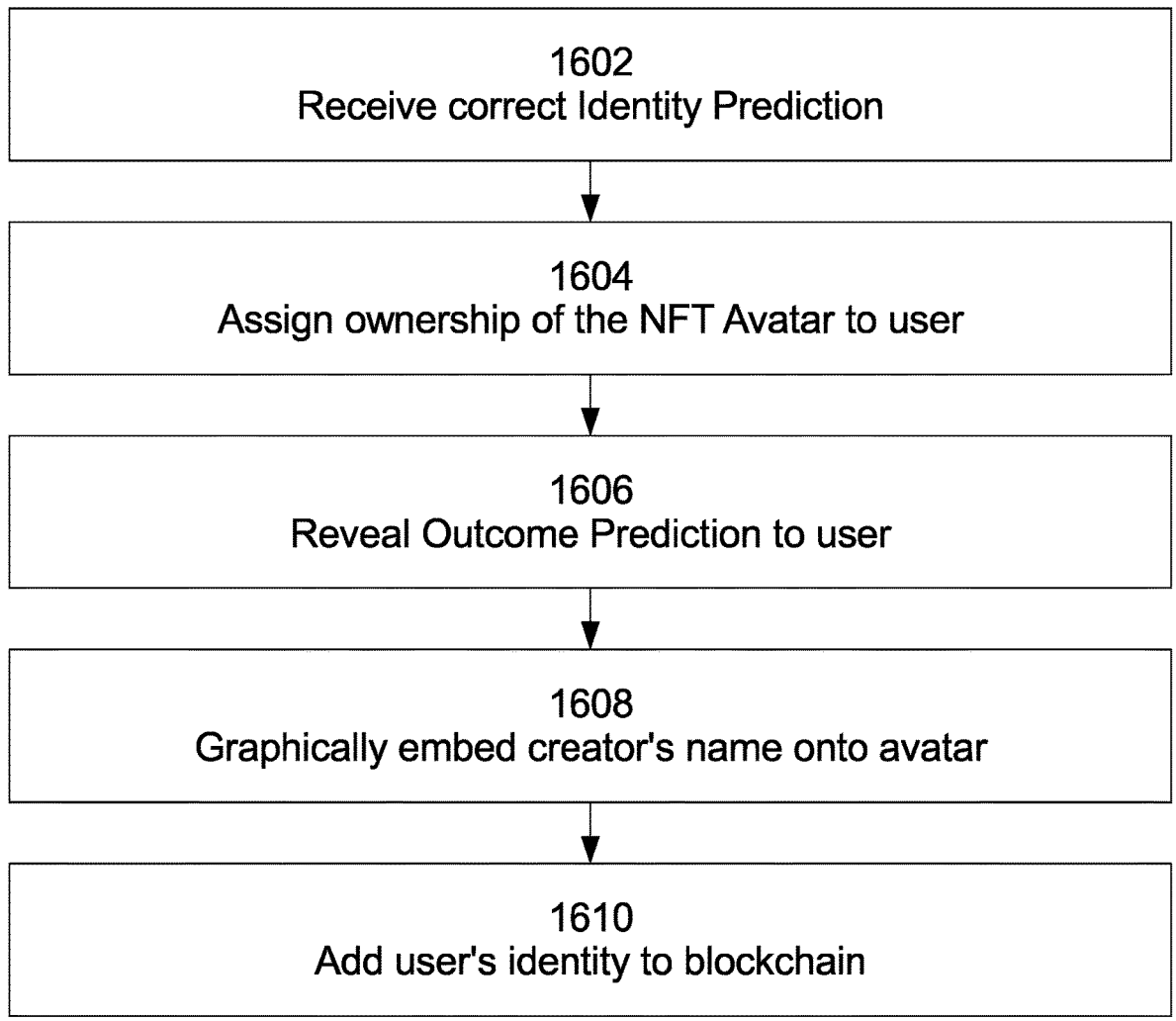
FIG. 16 shows an exemplary method of handling a correct Identity Prediction.

As shown in FIG. 16, upon receiving a correct Identity Prediction from a user 1602, the user is awarded ownership of the NFT Avatar 1604, the Outcome Prediction is revealed to the user 1606, the identity of the creator is graphically or otherwise embedded into the avatar 1608, and the user's name, username, or other form of identity is added to the blockchain of the NET Avatar 1610.

Figure 17:
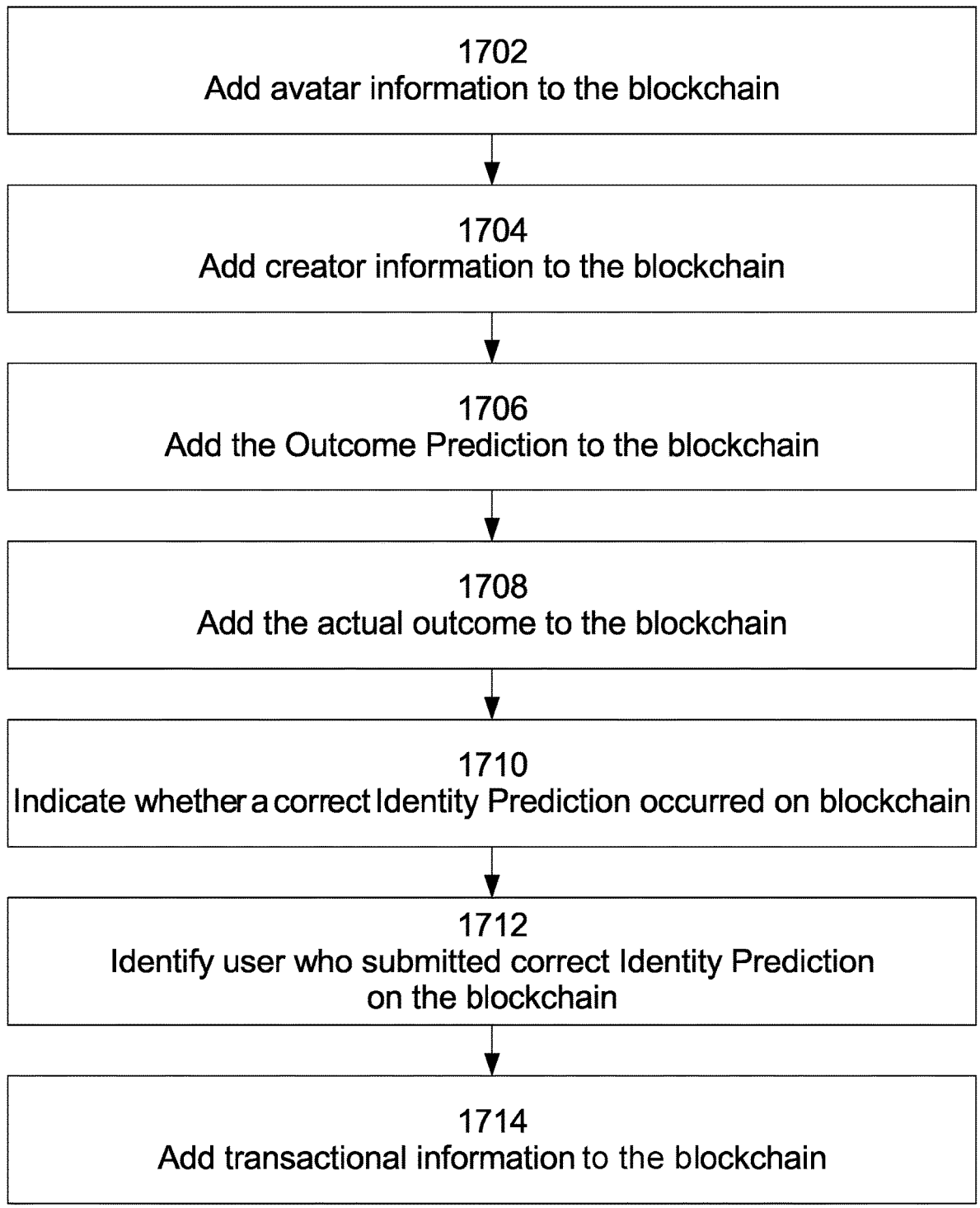
FIG. 17 shows an exemplary method of updating the blockchain.

As shown in FIG. 17, the platform will add to the blockchain information pertaining to the avatar itself, particularly graphical information and the history of graphical modifications based on events or time 1702, the creator of the avatar 1704, the Outcome Prediction 1706, the actual outcome 1708, whether a correct Identity Prediction occurred 1710, the user identity of the user who submitted the correct Identity Prediction 1712, and any and all transactions involving the NFT Avatar 1714.

The invention claimed is:

1. A system for creating and modifying non-fungible tokens comprising a set of computers programmed to operate over a network, the set of computers programmed for:
   a. receiving a request from a first user to create an NFT Avatar and receiving identifying information from the first user;
   b. receiving avatar data relating to a digital avatar from the first user;
   c. receiving an outcome prediction pertaining to a game event from the first user;
   d. receiving a request from the first user to embed one or more disguise elements into the digital avatar to conceal the identifying information of the first user;
   e. altering the graphical appearance of the digital avatar to disguise the identifying information;
   f. receiving a selection from the first user of one or more disguise elements onto which the outcome prediction is to be displayed;
   g. embedding the outcome prediction into the one or more disguise elements;
   h. receiving a request from the first user to conceal the outcome prediction using manipulations of graphical tools to change the graphical appearance of the digital avatar;
   i. altering the graphical appearance of the avatar to conceal the outcome prediction;
   j. receiving a request from the first user to at a later time alter the graphical appearance of the digital avatar in order to reveal the outcome prediction;
   k. incorporating the digital avatar into an NFT to create the NFT Avatar, with the NFT Avatar having a corresponding NFT Avatar blockchain;
   l. altering the graphical appearance of the avatar in order to reveal the outcome prediction;
   m. determining an actual outcome of the game event;
   n. receiving identity predictions from the users;
   o. determining if a second user submitted a correct identity prediction, and if so, assign ownership of the NFT Avatar to the second user by updating ownership information in the corresponding NFT Avatar blockchain.

2. The system of claim 1, the set of computers additionally programmed for:
   a. receiving wager information relating to the outcome prediction, with the wager information identifying the reward to be given the first user if the outcome prediction is correct.

3. The system of claim 1, with the game event occurring externally to the platform.

4. The system of claim 1, the set of computers additionally programmed for:
   a. revealing the outcome prediction only after a designated period of time prior to the game event.

5. The system of claim 1, the set of computers additionally programmed for:
   a. engaging with social media accounts owned by the first user to verify identifying information of the first user and to determine if the first user is a celebrity or influencer.

6. A system for creating and modifying non-fungible tokens comprising a set of computers programmed to operate over a network, the set of computers programmed for:
   a. receiving avatar data relating to a digital avatar from a first user;
   b. receiving an outcome prediction pertaining to an event from the first user;
   c. receiving a request from the first user to graphically disguise the digital avatar;
   d. altering the graphical appearance of the digital avatar to disguise identifying information of the first user;
   e. embedding the outcome prediction graphically into the digital avatar;
   f. incorporating the digital avatar into an NFT to create the NFT Avatar, with the NFT Avatar having a corresponding NFT Avatar blockchain.

7. The system of claim 6, the set of computers additionally programmed for:
   a. receiving identity predictions from the users;
   b. determining if a second user submitted a correct identity prediction, and if so, assigning ownership of the NFT Avatar to the second user by updating ownership information in the corresponding NFT Avatar blockchain.

8. The system of claim 6, the set of computers additionally programmed for:
   a. incorporating the outcome prediction into a wager and rewarding the first user if the outcome prediction is correct.

9. The system of claim 6, the set of computers additionally programmed for:
   a. disguising the identifying information by receiving selections from the first user of graphical disguise elements and covering portions of the digital avatar with the selected graphical disguise elements.

10. The system of claim 6, the set of computers additionally programmed for:
    a. disguising the identifying information by receiving selections from the first user of graphical portions of the digital avatar to alter and then altering the digital avatar based on the selections.

11. The system of claim 6, the set of computers additionally programmed for:
    a. embedding the outcome prediction graphically onto the digital avatar by receiving selections of graphical disguise elements or graphical portions of the digital avatar and displaying the outcome prediction on the selected graphical disguise elements or graphical portions of the digital avatar.

12. The system of claim 6, the set of computers additionally programmed for:
    a. altering the graphical appearance of the digital avatar to temporarily conceal the outcome prediction.

13. The system of claim 6, the set of computers additionally programmed for:
    a. receiving identity predictions from the users;
    b. determining if a second user submitted a correct identity prediction, and if so:
        i. assigning ownership of the NFT Avatar to the second user by updating ownership information in the corresponding NFT Avatar blockchain.

14. The system of claim 6, the set of computers additionally programmed for:
    a. receiving orientation, positioning, or movement data from VR implements;
    b. then using the orientation, positioning, or movement data to modify corresponding orientation, positioning, or movement attributes of the digital avatar.

15. A system for creating and modifying non-fungible tokens comprising a set of computers programmed to operate over a network, the set of computers programmed for:
    a. receiving avatar data relating to a digital avatar from a first user;
    b. receiving an outcome prediction pertaining to an event from the first user;
    c. receiving selections from the first user of graphical portions of the digital avatar onto which the outcome prediction is to be graphically displayed;
    d. embedding the outcome prediction in the digital avatar on the selections of graphical portions;
    e. receiving a first set of graphical manipulations from the first user for graphically concealing the outcome prediction;
    f. altering the graphical appearance of the avatar according to the first set of graphical manipulations to conceal the outcome prediction;
    g. receiving a second set of graphical manipulations from the first user for graphically revealing the outcome prediction at a later time;
    h. incorporating the digital avatar into an NFT to create the NFT Avatar, with the NFT Avatar having a corresponding NFT Avatar blockchain;
    i. altering the graphical appearance of the avatar according to the second set of graphical manipulations to reveal the outcome prediction.

16. The system of claim 15, the set of computers additionally programmed for:
    a. only altering the graphical appearance of the avatar according to the second set of graphical manipulations to reveal the outcome prediction at a designated time prior to the occurrence of the event.

17. The system of claim 15, the set of computers additionally programmed for:
    a. receiving a third set of graphical manipulations from the first user for a graphical alteration of the digital avatar to occur if the outcome prediction is correct.

18. The system of claim 17, the set of computers additionally programmed for:
    a. determining an actual outcome of the game event, then altering the graphical appearance of the avatar according to the third set of graphical manipulations if the outcome prediction is correct.

19. The system of claim 15, the set of computers additionally programmed for:
    a. receiving a request from the first user to embed one or more disguise elements into the digital avatar to conceal identifying information of the first user;
    b. altering the graphical appearance of the digital avatar to disguise the identifying information.

20. The system of claim 19, the set of computers additionally programmed for:
    a. receiving identity predictions from the users;
    b. determining if a second user submitted a correct identity prediction, and if so:
        i. assigning ownership of the NFT Avatar to the second user by updating ownership information in the corresponding NFT Avatar blockchain.

* * * * *